United States Patent Office 2,780,612
Patented Feb. 5, 1957

2,780,612

PIGMENTS AND PARTICLES WITH UNSATURATED SURFACE AND METHOD OF MAKING SAME

Theodore A. Te Grotenhuis, Olmsted Falls, Ohio, assignor of twenty percent to The General Tire & Rubber Company, Akron, Ohio, a corporation of Ohio No Drawing. Application October 12, 1951,
Serial No. 251,152

8 Claims. (Cl. 260—41)

The present invention is a continuation in part of my applications Serial No. 714,919, filed December 7, 1946, now U. S. Patent 2,610,167 and application Serial No. 585,824, filed March 30, 1945, and it relates to the treatment of fine particles such as pigments or fillers and fibers with surface reactive or bonding compounds containing organic radicals preferably with unsaturated portions thereon to obtain modified surface characteristics. In particular, the present invention relates to the treatment of fine particles with hydroxyl reactive unsaturated aliphatic organic compounds such as unsaturated organic isocyanate compounds to render the particles organophilic and reactive to polymerizable monomers and vulcanizable polymers and sulfur so as to be compatible with and attracted to organic compounds and to form unsaturated groups on the surface thereof to be interlocked with unsaturated organic materials such as rubber and polymerizable materials.

It is well-known that various pigments have natural tendencies toward being hydrophilic or attracted toward water and easily wet by it, or hydrophobic or non-wettable by water. The majority of pigments and filler materials such as titanium dioxide, clay, zinc oxide, sulfur, silica, and aluminum oxide tend to be hydrophilic. Carbon black, on the other hand, tends to be somewhat more hydrophobic. These tendencies are well recognized in the art and their effects readily observed.

Thus, when titanium dioxide, finely divided silica, zinc oxide, magnesia, calcium carbonate, or the like is dispersed in a water-in-oil or oil-in-water emulsion, it tends to go into the water phase. Likewise, with any natural or synthetic latex, or emulsion of polymerizable olefins, these inorganic pigments tend to stay in the water phase. As a result, there is a tendency for the pigment to be washed away in the water and it is not compatible with and well dispersed in the organic phase of the emulsion.

It is one object of the present invention to provide a method of treating fine particles such as pigments, fibers, and fabrics so that they are readily compounded with organic substances and so that they can be bonded thereto by chemical means such as by possible interpolymerization or by sulfur or chemical bridges.

It is another object of the present invention to provide a method of treatment for fine particles and fibers by which the particles are rendered more readily wettable and interlocked with polymerizable organic compounds and polymers.

It is still another object of the present invention to provide a simple and inexpensive method of improving the ease of dispersion and compounding of fine particles in organic vehicles and polymers.

Other objects and advantages will become apparent from the following description of my invention.

In accordance with the present invention, I subject the fine particles to contact with a hydroxyl reactive isocyanate compound such as an unsaturated isocyanate that has at least one NCO group attached to a radical or group selected from the group comprising unsaturated aliphatic and arylaliphatic groups. That is, I subject the particles to contact with an isocyanate having the general formula R—NCO where R is selected from alkenyl groups, arylalkenyl groups, etc. Where chemical interlocking is unnecessary and only hydrophobicity is desired, the isocyanate need not be unsaturated and alkyl isocyanates may be used. Such alkyl groups are not as desirable as unsaturated groups however, as bonds cannot be easily formed between polymers and the surface of the particles. Any of the commercially available pigments such as titanium dioxide, lead carbonate, carbon black, magnesia, finely divided silica which has sometimes been referred to as "white carbon black" such as the silicas made from organic silicates by combustion as well as fillers such as clay, ground wood, lignin, and textile fibers such as those of cotton and glass are susceptible to the treatment and interlocking of the present invention.

After treatment of the high surface area material in accordance with the subject invention, the isocyanate group or water reactive groups of the silicon compound reacts with the surface of the particles or oH group chemically attached thereto to form a chemical bond between the surface and the unsaturated or organic groups of the organo silicon or isocyanate compound. This renders the particles organophilic or hydrophobic and non-wettable by water. It greatly improves their dispersion in organic vehicles, their compatibility with resins and resin forming materials, and their effectiveness in water emulsions, and permits chemical interlocking of the surface of the pigment or fiber with unsaturated polymers such as diolefinic rubbers as well as with polymerizable unsaturated compounds such as styrene. Particles treated in accordance with the subject invention and incorporated in arylvinyl or olefinic monomeric polymerizable materials such as styrene, methylmethacrylate, or vinyl chloride, give stronger polymers with some of the particles apparently interlocked therein. Likewise, particles incorporated in unsaturated polymers such as any of the natural or synthetic rubbers, unsaturated polyesters, and to some extent even silicon elastomers give better tougher compounds.

The subject invention is especially useful in work with water emulsions even though the organic groups are saturated. In any water-in-oil or water-in-resin or resin-in-water emulsion the particles tend to wash into the water phase or remain near the interface between the two phases. Thus with an oil-in-water type of emulsion of a film forming material such for example as a resin solution when the emulsion is coagulated and precipitated, many of the pigments and filler particles, being in the water phase, tend to keep the particles from coalescing to a film or solid mass. When the pigments and filler particles are treated to render them organophilic, however, they go into organic film forming material and unite therewith and do not hinder film forming properties in this manner with the result that glossy pigmented films are produced.

In the case when emulsion paints comprising resin-in-water emulsions are spread to dry, ordinary pigments go into the water phase so that in the dried paint they have very poor bond with the resin, and a porous paint results with poor washing resistance. Pigments with organic reaction products of the organic isocyanates or organo silicons thereon, however, go into the resin phase and as the paint dries, unite with the resin to give a firm, smooth water resistant film.

When the pigment of particle and particularly a high surface area pigment is to be used as a reinforcing agent for a polymer of a polymerizable monomer such as one or more of the polymerizable mono-olefinic compounds or when it is to be incorporated into an unsaturated polymer such as a rubber or certain polyesters, unsaturated groups on the pigment surface are highly desirable for interlocking and obtaining reinforcement and accordingly unsaturated aliphatic organic groups in the treating compound should be present for best results.

The pigments or particles are modified in accordance with the invention by subjecting the dry fine particles to an unsaturated organic isocyanate having a —NCO group, or by dissolving the isocyanate or compound in an inert dry organic solvent free of hydroxyl, amino, and carboxyl groups such as ether, carbon tetrachloride, toluene, and the like and shake the two together for a brief period of time, such as a minute or more and draining off the solvent, and drying the particles. In the alternative, I can subject the particles to the vapor from the more volatile isocyanates such as methyl isocyanate, vinyl isocyanate, and phenyl isocyanate. It is sometimes advisable to heat the particles and isocyanate under vacuum or reduced pressure to thoroughly vaporize it.

Various isocyanates can be utilized. For example, I can use alkyl isocyanates such as methyl, ethyl, chlorethyl, and isobutyl isocyanate, or aryl isocyanates such as phenyl isocyanate $CH_3C_6H_4NCO$ or alkylenyl isocyanates such as chlorethylenyl, vinyl, and propenyl or allyl isocyanate and their homologues.

The following examples illustrate the present invention in more detail.

*Example 1*

100 grams of unbeaded carbon black are subjected to agitation in the presence of a vapor from about 5 grams of a mixture of methyl and ethyl isocyanate. The agitation is continued for around ten minutes to allow for a thorough penetration of the vapor. The carbon black thus treated has much less tendency to be wet by water and much greater tendency to be wet by hydrocarbon organic solvents.

When in the above example, vinyl isocyanate is substituted for the methyl and ethyl mixture the black has similar characteristics but also has unsaturated groups on the surface for interlocking with unsaturated organic compounds and vulcanizing agents such as sulfur.

*Example 2*

100 grams each of titanium dioxide and a finely divided silica, which sometimes has been termed "white carbon black" having a surface area of more than 50 square meters per gram is separately subjected to agitation in the presence of 10 grams of vinyl isocyanate in a closed dry vessel under sufficiently reduced pressure to insure the presence of the isocyanate vapor. The agitation is continued for around ten minutes to allow for a thorough penetration of the vapor. Both the titanium dioxide and the silica thus treated have much less tendency to be wet by water and a much greater tendency to be wet by hydrocarbon organic solvents and has unsaturated groups for attachment to unsaturated materials either by sulfur bridging or by polymerization interlocking.

*Example 3*

The methyl and ethyl isocyanate compounds of Example 1 are substituted by allyl isocyanate dissolved in 200 grams of anhydrous toluene. 100 grams of carbon black is thoroughly wet by the solution thus formed and after evaporation of the solvent is found to have an exceedingly strong affinity for organic hydrocarbons.

*Example 4*

300 grams of finely divided silica having a surface area of over 80 square meters per gram and treated with allyl isocyanate as was the carbon black of Example 3 and ground in a ball mill with approximately 100 grams of water containing 30 grams of Daxad (a condensation product of naphthaline sulfonic acid and formaldehyde). The aqueous dispersion thus prepared is mixed with about 1800 parts of rubber latex containing 50% of rubber solids, about 5 parts of zinc oxide and 1 part of sulfur. Films formed from the compounded latex mixture after drying and vulcanization have high strength. The latex mixture upon coagulation and slight mastication is found to have the silica dispersed therein, suitable for interaction with the rubber hydrocarbon as evidenced by a reinforcing effect similar to that of carbon black upon cure of the mixture.

The rubber latex of the above example may be substituted in whole or in part with a latex of natural or synthetic rubber or resinous polymer and particularly a sulfur vulcanizable or synthetic rubber or the like, or mixtures of these materials to produce articles having the desirable characteristics of various articles of manufacture.

*Example 5*

5 parts of titanium dioxide treated as in Example 2 is dispersed into 100 parts by weight of styrene containing about ½ part of benzoyl peroxide and ½ part of soya lecithin by passing the mixture through a colloid mill. The dispersion thus prepared is strongly agitated to maintain a suspension (fine droplets of styrene throughout the aqueous phase). The aqueous fluid is maintained in a completely filled vessel under super atmospheric pressure for several hours with said agitation until polymerization of the styrene in suspended form is had. The polystyrene thus obtained upon coagulation and drying of the suspension is desirable for use as a molding powder and in the preparation of plastic articles or for solution in the preparation of a coating composition.

*Example 6*

20 parts of titanium dioxide, preferably treated as in Example 2, is dispersed in about 125 parts of a creamy viscosity solution consisting of an alkyd resin, such as glycerol phthalate or tung oil modified glycerol phthalate resin, and dissolved in a volatile solvent such as a mixture of xylene and butyl acetate containing a small amount of a high boiling ester, such as dibutyl phthalate, diorphotoluyl phthalate, etc. The dispersion thus obtained is emulsified in 1½ times its volume in an aqueous solution containing 3% gelatin and 3% ammonium hydroxide. The emulsion thus prepared is especially desirable as a coating or coloring composition.

*Example 7*

100 grams of matted glass fiber is subjected to the vapor from 10 grams of allyl isocyanate in benzene at slightly elevated temperature. The fibers are maintained in contact with the isocyanate for approximately 15 minutes and then withdrawn and dried. These fibers are then wetted with a polymerizable polyester compound comprising 200 parts of monomeric styrene and 200 parts of a syrupy condensation product of 100.1 parts of ethylene glycol or diethylene glycol, 80 parts of adipic acid and 20 parts of maleic anhydride. The wetted fibers are molded and allowed to set up in the mold in the usual manner. The resulting compound is found to have increased water resistance and strength compared to compounds made from untreated glass fibers.

In this example, other textile fibers such as cotton and rayon fibers may be substituted for the glass fibers.

*Example 8*

50 parts of carbon black treated with methyl and ethyl isocyanates as utilizing the procedure of Example 3, except that the isocyanates were not unsaturated, are dispersed in 15 parts of resin varnish, 10 parts of gilsonite varnish, 430 parts new zinc oil (petroleum oil) and about 5 parts of a 25% solution of a mixture consisting of 1 part of barium naphthenate and 30 parts of polyisobutylene by grinding the ingredients together in a ball mill for a relatively short time. The ink thus obtained has an unusual degree of jetness showing a complete dispersion of carbon black in the organic vehicle.

In the above examples, the unsaturated isocyanates may be substituted by other unsaturated isocyanates.

The pigments and fibers of the above examples may be substituted in whole or in part by other pigments and fibers. The solvent used for the i. e. toluene, benzene, and the like may be substituted by other anhydrous solvents which do not contain the hydroxyl, amine, or other group for reaction with isocyanates and hydroxyl reactive silicon compounds.

The styrene in the above examples may be substituted in whole or in part by other polymerizable olefinic materials such as substituted styrenes, mixtures of styrenes, and alpha methylstyrene or their polymerizable derivatives and homologues, acrylic and methacrylic esters, amids and nitriles, and to some extent vinyl and vinylidene esters etc. The polyester of Example 8 may be substituted by other unsaturated polyesters to obtain particular properties desired.

It is to be understood that in accordance with the provisions of the patent statutes, variations and modifications of the specific invention herein shown and described for purposes of illustration may be made without departing from the spirit of the invention.

What I claim is:

1. A particle of an inorganic solid which is normally hydrophilic but which is modified by having bonded to the surface thereof unsaturated hydrocarbon groups from an aliphatic isocyanate, said hydrocarbon groups being bonded through the residue from the reaction of a —NCO group of said isocyanate with the surface of said particle.

2. A solid body comprising a solid, synthetic organic polymer of an olefinic monomer, having dispersed therethrough inorganic solid particles, the surface of which is chemically united to the said solid polymer through the residue from the reaction of an isocyanate group of an organic isocyanate with a hydroxyl group on the surface of said particles.

3. A solid synthetic organic polymer of a polymerizable material having olefinic unsaturation, having distributed therein a reinforcing material selected from the group consisting of powders and fibers which are bonded to said high polymer through a linkage formed by the residue from the reaction of said polymerizable material, and unsaturated aliphatic groups bonded to the surface of the reinforcing material through the residue from the reaction of an isocyanate having a carbon-to-carbon double bond with said reinforcing material.

4. A solid in situ solidified synthetic organic polymer of a polymerizable olefinic compound having distributed therethrough a reinforcing material selected from the group consisting of powders and fibers which normally have hydroxyl groups on their surfaces, but which are modified by having olefinic groups of two to three inclusive carbon atoms bonded to the surface thereof through the residue from the treatment of the surface of said reinforcing material with an unsaturated organic isocyanate having carbon-to-carbon double bonds, whereby said polymer is chemically bonded to said reinforcing material through the interaction of said polymerizable material with the said olefinic groups on the said reinforcing material.

5. In a method for bonding together particles selected from the group consisting of inorganic powders and fibers normally having hydroxyl groups on their surfaces, the steps which comprise treating said particles with an olefinically unsaturated organic isocyanate to bond an unsaturated group to the surface of said particles through the residue from the reaction of said isocyanate on the surface of said particles, incorporating the thus treated particles into a polymerizable synthetic organic material having olefinic groups for interaction with said vinyl group during the polymerization of said material to form a chemical bond therewith, and permitting said material to polymerize in contact with said particles.

6. In a method for forming strongly bonded composite articles comprising an inorganic powder having particles bonded together by a solid synthetic organic polymer of a polymerizable olefinic compound, the steps which comprise incorporating into a solid synthetic organic plastic mixture containing olefine groups for entering into polymerization, inorganic particles having vinyl groups bonded to the surface thereof through the residue from the treatment of said particles with a vinyl isocyanate, and thereafter treating said plastic mixture to change it from the plastic to the nonplastic state, and to react said material with said vinyl groups, thereby chemically bonding said particles to said mixture, said powder normally having hydroxyl groups on its surface.

7. An inorganic powder normally having hydroxyl groups thereon but which is modified by having vinyl groups chemically bonded to the surface portion thereof through the residue from the treatment of surfaces of said powder with an unsaturated organic isocyanate having carbon-to-carbon double bonds and an —NCO group, said vinyl groups being attached directly to a carbon atom present in said organic isocyanate.

8. In a process of preparing high surface area particles selected from the group consisting of powders and fibers having unsaturated groups over surface portions thereof for reaction with unsaturated materials and vulcanizing agents during polymerization and vulcanization, the steps which comprise contacting the dry surfaces of said particles with an unsaturated isocyanate having an —NCO group, and permitting said isocyanate and surfaces to remain in contact until the surface characteristics are modified, said particles normally carrying hydroxyl groups on their surface.

References Cited in the file of this patent

UNITED STATES PATENTS

| | | |
|---|---|---|
| 284,289 | Fleming | Sept. 4, 1883 |
| 2,196,033 | Schuhmann | Apr. 2, 1940 |
| 2,273,040 | Iler | Feb. 17, 1942 |
| 2,284,895 | Hanford et al. | June 2, 1942 |
| 2,358,683 | Bradshaw | Sept. 19, 1944 |
| 2,439,689 | Hyde | Apr. 13, 1948 |